United States Patent [19]

Taitel et al.

[11] 4,114,909
[45] Sep. 19, 1978

[54] CORE LOCKING DEVICE

[75] Inventors: Charles M. Taitel, Parsippany; Ralph L. Ryan, Lake Parsippany, both of N.J.

[73] Assignee: JRC Products, Inc., Boonton, N.J.

[21] Appl. No.: 669,218

[22] Filed: Mar. 22, 1976

[51] Int. Cl.² ............................................. B23B 31/40
[52] U.S. Cl. .................................. 279/1 Q; 279/2 A; 242/72 B
[58] Field of Search .................... 279/2 A, 2, 1 Q; 269/48.1; 242/72 B

[56] References Cited

U.S. PATENT DOCUMENTS

| | | | |
|---|---|---|---|
| 2,583,117 | 1/1952 | Piperoux et al. | 242/72 B |
| 3,032,288 | 5/1962 | Tidland | 242/72 B |
| 3,741,571 | 6/1973 | Prazak | 279/1 Q X |
| 3,904,144 | 9/1975 | Gattrugeri | 242/72 B |

FOREIGN PATENT DOCUMENTS 1,114,698  10/1961  Fed. Rep. of Germany ......... 242/72 B

*Primary Examiner*—Horace M. Culver
*Attorney, Agent, or Firm*—Gerald Durstewitz

[57] ABSTRACT

An expandable device for locking an annular core to a shaft for rotation therewith in which an annular body mounts on the shaft and carries a plurality of radially movable bars overlying a single-wall annular bladder lying against the surface of the body. The bars are positioned side by side around the circumference of the body and are interconnected by linking members to limit radial movement. An annular notched band is secured to the body of each end of the bars and engages recesses therein to transmit torque between the bars and the body. Pressurized air is introduced between the bladder and the surface of the body to force the bars radially outward to grip the core.

7 Claims, 6 Drawing Figures

# CORE LOCKING DEVICE

BACKGROUND OF THE INVENTION

The present invention relates to devices for transmitting torque between a shaft and a member mounted on the shaft, and, more particularly, to expandable devices for locking a centrally bored core type member to a shaft element.

Paper and plastic web materials utilized in industry for packaging, labeling, and other purposes are supplied in rolls that are wound upon tubular cores. When the rolls are being wound and unwound, the cores are mounted on shafts that are journalled in bearings and are either driven or restrained (by a braking arrangement) usually in a manner such that the web is under constant tension. Expanding devices commonly referred to as "air chucks" or "air shafts" are normally used to lock the core to the journalled shaft so that the web rolls rotate with the shaft as a unit. The term "air chuck" is normally used to designate a short device which is locked to a shaft by set screws and can be used alone to secure a narrow roll or can be used as one of a pair to secure a wide roll. In the latter instance, the chucks are spaced on the shaft so as to engage the ends of the core of the wide roll. The term "air shaft" normally is used to designate a longer device which is essentially an elongated air chuck constructed with an integral shaft. A shaft portion extends from each end of the air shaft. The "air shaft" is utilized for wide rolls, and, after the roll is slid thereon, the end shaft portions are positioned in the bearings which will support the roll.

The prior art air chucks and air shafts employ some form of double-walled annular inflatable bladder. In the simplest designs the bladders are doughnut-shaped and expand directly against the inner surface of the core. These designs are the least expensive and have the greatest torque transmitting ability since the entire surface of the bladder is in contact with the core. The bladder does not, however, provide a rigid driving connection between the shaft and core and cannot be used effectively with sensitive tension control equipment. In other designs, the bladders are positioned within cylindrical casings which have sections which move radially against the core when the bladder is inflated. The radially movable sections constitute a relatively small portion of the outer surface of the casing, therefore, only a fraction of the energy stored in the inflated bladder is used to grip the core and the torque transmitting capacity of these devices is limited. These designs are also fairly complex and tend to be relatively expensive to manufacture.

SUMMARY OF THE INVENTION

It is therefore an object of the present invention to provide an improved expandable device for locking a core to a shaft element.

Another object is to provide such a device which is simple, effective, and inexpensive.

Another object is to provide such a device which utilizes an inexpensive single-wall annular bladder.

Another object is to provide such a device wherein all of the energy stored in the bladder is utilized.

Another object is to provide such a device which establishes a rigid driving connection between the shaft elements and the roll core.

The foregoing objects are accomplished by providing an expandable device comprising an annular body member, a single-wall annular bladder surrounding the body member, means for sealing the ends of the bladder to the body member, a plurality of core-engaging members mounted on the body for radial movement, means for introducing fluid medium under pressure between the bladder and the body, and means for locking the core-engaging members against relative rotational movement with respect to the body.

BRIEF DESCRIPTION OF THE DRAWINGS

Preferred embodiments of the invention have been chosen for purposes of illustration and description, and are shown in the accompanying drawings, forming a part of the specification, wherein.

DESCRIPTION OF THE PREFERRED EMBODIMENTS

Figure 1:
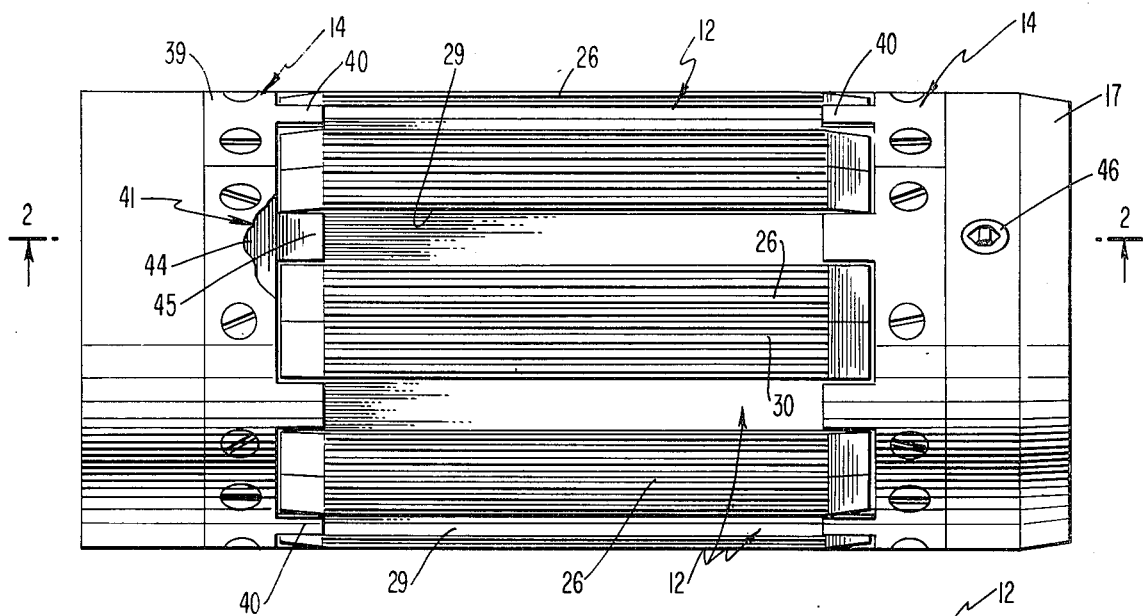
FIG. 1 is a side view of one embodiment of the present invention.

With reference to FIGS. 1 to 4 of the drawings, there is shown an air chuck in accordance with the present invention which generally comprises an annular body 10, a tubular single-wall bladder 11, eight core-engaging bars 12, and a torque transmitting ring 14 mounted on each end of the body.

The body 10 is formed with a small diameter main section 15 and enlarged end sections 16 and 17. Three parallel circumferential ridges 19 are provided at each end of the main section 15. The bladder 11 is made of an elastic material such as neoprene rubber and is positioned on the main section 15 by sliding it over one of the end sections 16 or 17. A band 20 of high tensile strength adhesive tape, e.g., a filament tape having a strength of 450 pounds per linear inch, is wound around the ends of the bladder under tension so as to tightly press the bladder onto the ridges 19 to provide an airtight seal with the body. A passageway 21 extends from the end wall of the section 16 to the surface of the main section 15 beneath the bladder 11. The passageway includes a stepped bore having a threaded large diameter section 22 and a narrow section 24, and a radial bore 25 which intersects the section 24. An air valve 23 is threaded into the bore section 22.

Figure 3:
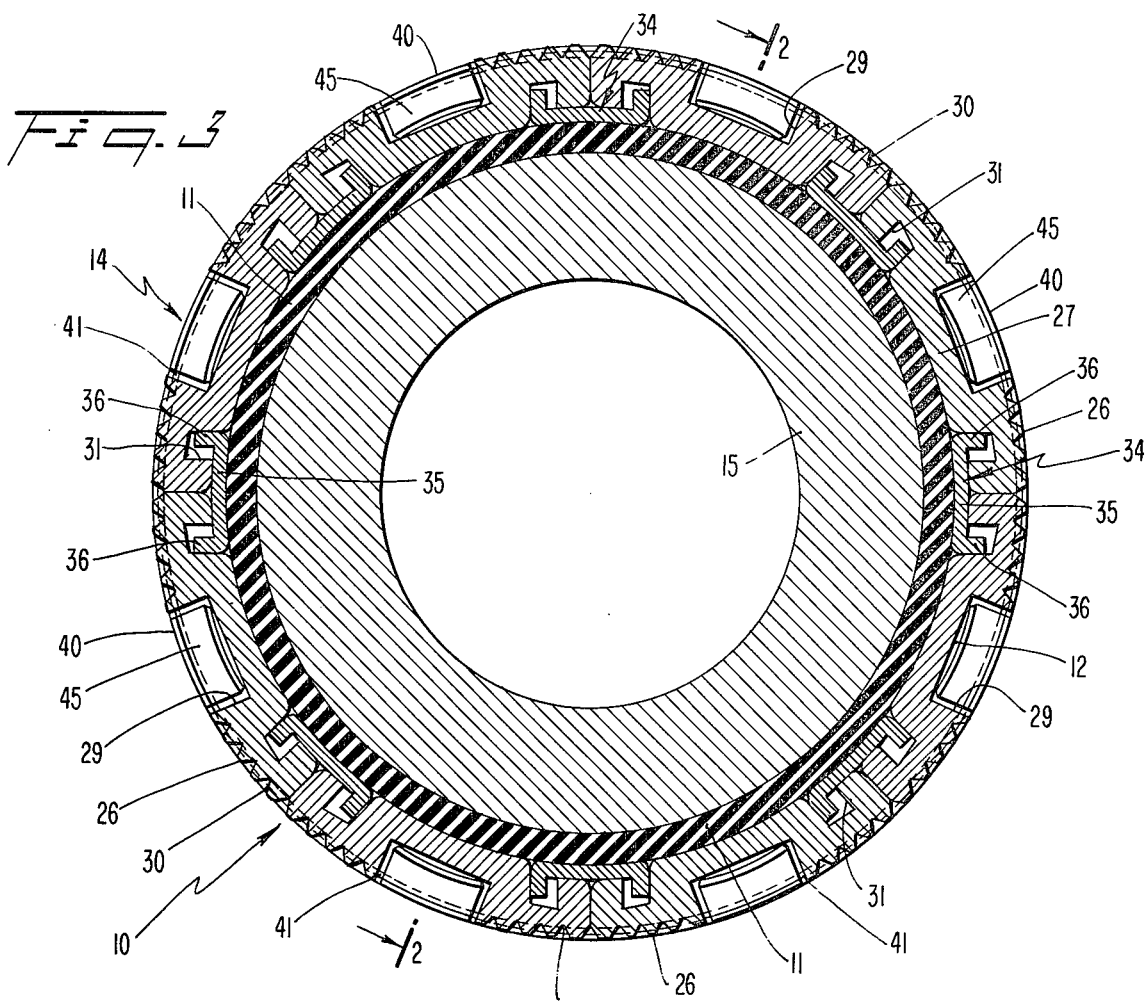
FIG. 3 is a partial transverse sectional view taken along line 3—3 on FIG. 2.

The bars 12 are arcuate in cross-section, as shown in FIG. 3, and are positioned side by side around the circumference of the bladder. Each bar is formed with a pair of longitudinally extending edge portions 26 separated by a thin central portion 27 which defines a longitudinally extending recess 29 at its outer surface. The edge portions 26 are provided with a series of longitudinal "V-shaped" grooves 30 on the outer surface thereof to grip the roll cores. Each of the edge portions 26 also has a rectangular longitudinally extending groove 31 formed in its inner surface. Elongated "U-shaped" link members 34 interconnect adjacent bars. Each link member 34 has a base 35 underlying the edge portions of adjacent bars and lips 36 on each side of the base extending into the adjacent grooves 30. The part of the edge portions 26 which lie between the groove 30 and the edge of the bar is cut away to accommodate the link member 34 so that the inner surface of the link member is flush with the inner surface of the rest of the bar.

The torque transmitting rings 14 each comprise a metal band 39 formed with eight tooth elements 40 extending therefrom into the ends of the recesses 29 in the bars 12. The body sections 16 and 17 are recessed to accept the rings 14 and a spring ring 41 so that the outer surface of each of the rings 14 is flush with the surface of the sections 16 and 17. The rings 14 are clamped to the body 10 by means of machine screws 42 which pass through holes in the band 39 and are threaded into the body portions 16 and 17. The spring rings 41 are formed of thin spring steel material and include a band 44 from which flat fingers 45 extend into the recesses 29 under the teeth 40. The fingers 44 are bent inwardly to contact the bottom of the recesses 29 of each of the bars to urge the bars radially inwardly and thus to retract the bars when the bladder lies against the surface of the section 15. The body 10 is provided with threaded transverse bores to accommodate set screws 46.

Figure 6:
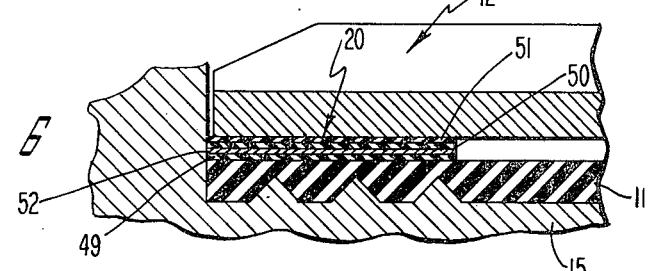
FIG. 6 is an enlarged fragmentary view of a portion of FIG. 2.
Figure 2:
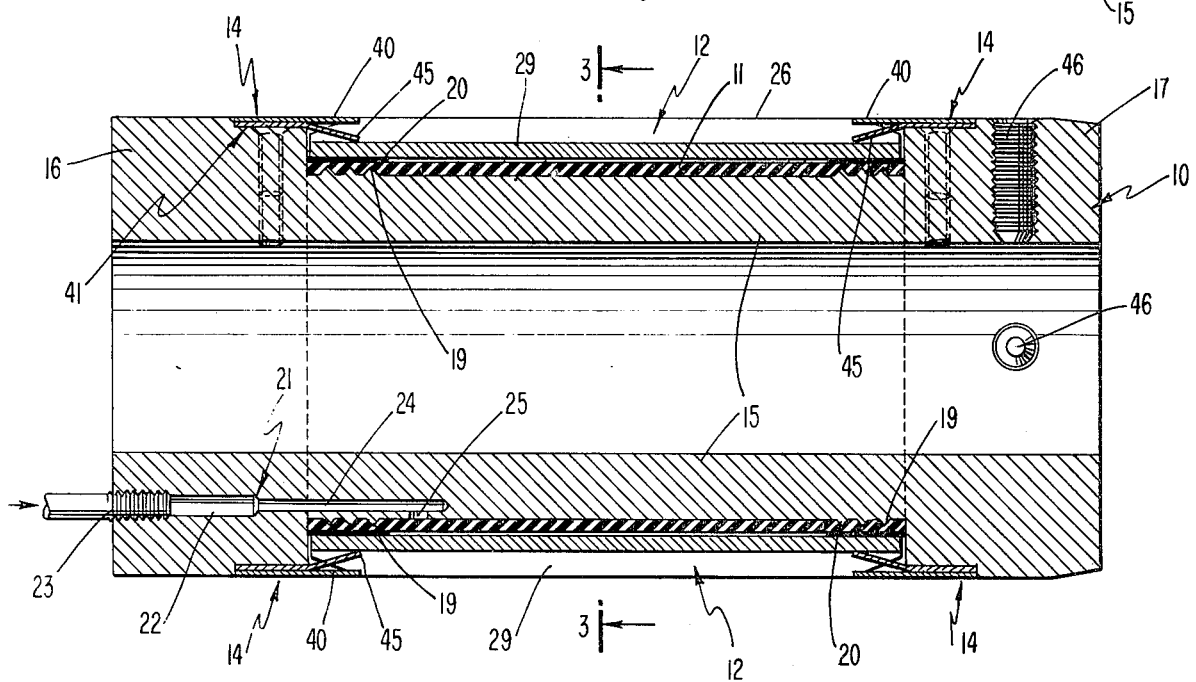
FIG. 2 is a longitudinal sectional view taken along line 2—2 on FIG. 1.

Referring now to FIG. 6, the bands of tape 20 include a number of turns of tape 49, 50 and 51 and a thin metal strip 52 having a length generally equal to the circumference of the layer 49 is placed between the first and second turns to prevent the tape band from being pushed or rolled back toward the ends of the bladder 11. As the first turn of tape is applied to the body section 15, the metal strip, which is 0.006 inch thick and ½ inch wide, is laid over the first layer of tape and several turns of tape are placed on top of the strip.

Figure 4:
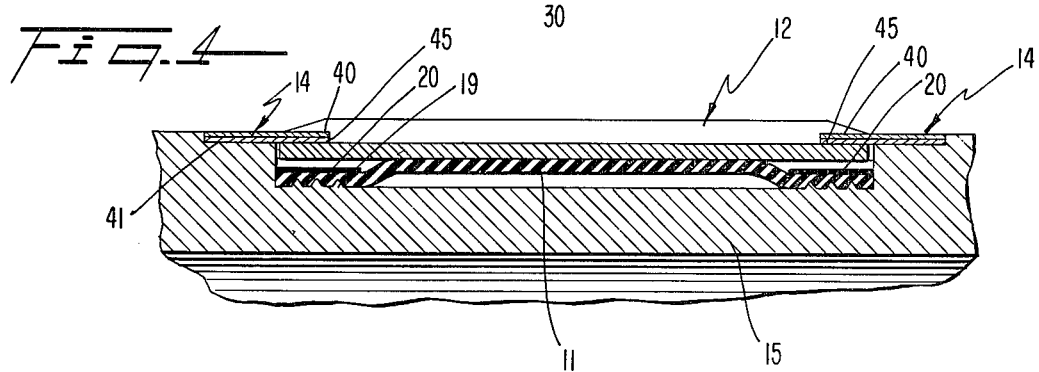
FIG. 4 is a fragmentary sectional view illustrating the device in its operated condition.

In operation, the device is mounted on a shaft and locked thereto by means of the set screws 46. The spring rings 41 hold the bars 12 against the bladder presenting a flush outer surface. The roll core is slid over the body so that it covers the bars 12. An air hose from a source of pressurized air is then applied to the valve 23 and the pressurized air flows through the valve, through the bores 24 and 25, and between the bladder 11 and the surface of the body section 15. The bladder stretches and moves away from the surface of the body pushing the bars 12 outwardly as shown in FIG. 4. The outer surface of the bars are thus pressed against the inner surface of the roll core locking the bars to the core. The torque rings 14 lock the bars 12 against relative rotational motion with respect to the body 10 and the shaft to which the body is locked.

As the bars 12 move radially outwardly, they separate from each other. When the bars separate, the link members 34 present a smooth continuous surface to the bladder to prevent the bladder from being forced between the bars and damaged. The link members restrict the amount which adjacent bars can separate from each other. This limits the radial movement of the bars and prevents damage to the device from pressurization when a proper size core is not mounted on the device. The link members also strengthen the device by carrying the air pressure load directed toward the gap between bars and transmitting that load along the full length of the bars.

Figure 5:
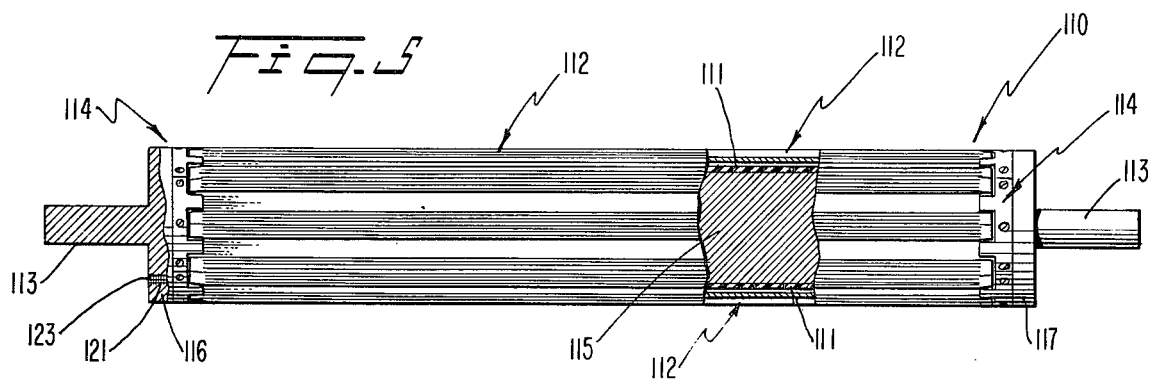
FIG. 5 is a side view of a second embodiment of the present invention.

Referring now to FIG. 5, there is shown an air shaft according to the present invention which is an elongated version of the air chuck shown in FIGS. 1 to 4 with an integral shaft. This embodiment includes a body 110, a bladder 111, a plurality of bars 112, and a pair of torque transmitting rings 114. The body 110 is solid and is formed with shaft portions 113 extending from the ends thereof and has a small diameter center section 115 which is greatly elongated with respect to the section 15 of the first embodiment. The body 110 has enlarged end sections 116 and 117 which are identical to the sections 16 and 17 of the first embodiment. The torque transmitting rings 114 are identical to the rings 14 of the first embodiment, and spring rings identical to the spring rings 41 of the first embodiment may be provided under the rings 114. The bars 112 and the bladder 111 are constructed in the same manner as are the bars 12 and the bladder 11 of FIGS. 1 to 4 except that they are elongated to the same extent as is the center section 115. The sealing arrangement between the section 115 and the bladder 111 is the same as that shown in FIGS. 1 to 4 with respect to the section 15 and the bladder 11. Link members (not shown) are provided to link the bars 112. They are constructed as are the link members 34 of the first embodiment except that they are elongated to the same extent as are the bars 112. A passageway 121 provided with a valve 123 admits air under pressure between the bladder 111 and the surface of the section 115 in the manner disclosed in connection with the first embodiment.

In use, a wide roll of web material is placed on the shaft and the shaft ends 113 are journalled in bearings. The air shaft is operated by introducing pressurized air through the valve 123 to move the bladder 111 outwardly and to press the bars 112 against the inner surface of the roll core.

Alternately, an air shaft (not shown) can be provided which is essentially a series of air chucks arranged end to end. This can be accomplished by forming the body 110 with intermediate enlarged sections axially spaced between the end sections 116 and 117. These enlarged sections are of the same diameter as the end sections 116, 117 and carry torque transmitting rings on each edge. A plurality of core engaging bars are positioned between adjacent enlarged sections, and individual bladders are provided for each set of bars. An air passageway extends through the body parallel to the axis thereof with transverse passageways provided for each of the bladders. All of the parts of such an air shaft, except for the body, are identical with the air chuck parts so that both air chucks and air shafts can be produced at minimum expense.

It can be seen from the foregoing that the present invention provides an improved expandable device for locking a core to a shaft element and also fulfills all of the other objects stated hereinabove.

As various changes may be made in form, construction, and arrangement of the parts herein, without departing from the spirit and scope of the invention and without sacrificing its advantages, it is to be understood that all matter herein is to be interpreted as illustrative and not in any limiting sense.

What is claimed is:

1. An expandable device for locking a bored member to a shaft element comprising in combination a body member having an annular surface adapted to be positioned within the bore, said body having enlarged diameter portions at each end of said annular surface, an annular single-wall expandable bladder covering said annular surface, means for sealing the ends of said bladder to said surface, a plurality of core-engaging bars extending axially along said bladder between said enlarged body portions and positioned side to side around the circumference of said bladder, said bars having longitudinally extending edges, means for introducing fluid medium under pressure between said bladder and said surface to force said core engaging members against the inner surface of the bore, means for locking the core-engaging members against relative rotational movement with respect to said body, and members positioned between said bladder and said bars linking the edges of said bars to limit movement of said bars away from each other in response to inflation of said bladder, said bars being provided with axial grooves adjacent each longitudinal edge on the inner surface thereof and said linking members engage said grooves and extend between adjacent bars.

2. Apparatus according to claim 1, wherein the portion of the bars between the longitudinal edge thereof and the groove adjacent thereto is recessed to accept said linking members and wherein said linking members have lips for engaging said grooves, said grooves being wider than said lips to permit limited radial movement of said bars.

3. Apparatus according to claim 1, wherein said means for locking said bars are formed with recess means at each end of said bars and tooth members secured to said body member and engaging said recess means to lock the bars against tangential movement with respect to said body member.

4. An expandable device for locking a bored member to a shaft element comprising in combination a body member having an annular surface adapted to be positioned within the bore, said body having enlarged diameter portions at each end of said annular surface, an annular single-wall expandable bladder covering said annular surface, means for sealing the ends of said bladder to said surface, a plurality of core-engaging members mounted on said body to be moveable outwardly away from said surface, means for introducing fluid medium under pressure between said bladder and said surface to force said core-engaging members against the inner surface of the bore, and means for locking said bars against relative rotational movement with respect to said body, said locking means including recess means at each end of said bars and tooth members secured to said body member and engaging said recess means to lock the bars against tangential movement with respect to said body member, said tooth members being annular rings secured to said enlarged diameter portion and formed with teeth extending into said recess means at the ends of said bars.

5. Apparatus according to claim 4, including an annular flat spring member positioned under each of said tooth members, said spring member having fingers positioned under said teeth and extending inwardly at an angle against said bars to bias said bars into a radially inward position.

6. An expandable device for locking a bored member to a shaft element comprising in combination a body member having an annular surface adapted to be positioned within the bore, said body having enlarged diameter portions at each end of said annular surface, an annular single-wall expandable bladder covering said annular surface, means for sealing the ends of said bladder to said surface, a plurality of core-engaging bars extending axially along said bladder between said enlarged body portions and positioned side to side around the circumference of said bladder, said bars having longitudinally extending edges, means for introducing fluid medium under pressure between said bladder and said surface to force said core-engaging members against the inner surface of the bore, means for locking the core-engaging members against relative rotational movement with respect to said body, and members positioned between said bladder and said bars linking the edges of said bars to limit movement of said bars away from each other in response to inflation of said bladder, said means for locking said bars being formed with recess means at each end of said bars and tooth members secured to said body member and engaging said recess means to lock the bars against tangential movement with respect to said body member said tooth members being annular rings secured to said enlarged diameter portion and formed with teeth extending into said recess means at the ends of said bars.

7. Apparatus according to claim 6, including an annular flat spring member positioned under each of said tooth members, said spring member having fingers positioned under said teeth and extending inwardly at an angle against said bars to bias said bars into a radially inward position.

* * * * *